US006574300B1

(12) United States Patent
Florent et al.

(10) Patent No.: US 6,574,300 B1
(45) Date of Patent: Jun. 3, 2003

(54) IMAGE PROCESSING METHOD, SYSTEM AND APPARATUS FOR NOISE REDUCTION IN AN IMAGE SEQUENCE REPRESENTING A THREADLIKE MOVING OBJECT

(75) Inventors: Raoul Florent, Valenton (FR); Claude Mequio, Villejuif (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/701,630
(22) PCT Filed: Mar. 28, 2000
(86) PCT No.: PCT/EP00/02730
§ 371 (c)(1),
(2), (4) Date: Nov. 30, 2000
(87) PCT Pub. No.: WO00/60541
PCT Pub. Date: Oct. 12, 2000

(30) Foreign Application Priority Data

Mar. 30, 1999 (EP) .............................................. 99400779

(51) Int. Cl.$^7$ .............................................. G06T 5/00
(52) U.S. Cl. .............................. 378/19; 378/901; 378/4; 382/132
(58) Field of Search .............................. 378/4, 19, 901, 378/62, 98.12, 98; 382/132

(56) References Cited

U.S. PATENT DOCUMENTS 5,809,105 A 9/1998 Roehm et al. ............ 378/98.12

FOREIGN PATENT DOCUMENTS

EP 0 871 143 * 10/1998

OTHER PUBLICATIONS

Aufrichtig et al., "X–ray Fluoroscopy Spatio–Temporal Filtering With Object Detection", IEEE Transaction on Medical Imaging, US, IEEE Inc., New York, vol. 14, No. 4, Dec. 1, 1995, pp. 733–746.*

* cited by examiner

Primary Examiner—Drew A. Dunn
(74) Attorney, Agent, or Firm—John Vodopia (57) ABSTRACT

The invention relates to an image processing method for noise reduction in a sequence of noisy original images representing a threadlike structure moving on a background, said method comprising: an acquisition of the digital pixel value at a current pixel location in a first and a second successive original image of the sequence, an extraction of the thread-like structure for providing first and second binary mask image pixel values at said location from said first and second original image, spatial and time-filtering of the pixel value of the second original image, and a pixel value selection based on said binary mask image pixel values for providing respectively, as a finally filtered pixel value, either the spatially or time-filtered pixel value respectively, as a threadlike structure filtered or a background pixel value. The invention also relates to a system and an apparatus for carrying out the method.

10 Claims, 5 Drawing Sheets

IMAGE PROCESSING METHOD, SYSTEM AND APPARATUS FOR NOISE REDUCTION IN AN IMAGE SEQUENCE REPRESENTING A THREADLIKE MOVING OBJECT

BACKGROUND OF THE INVENTION

Field of the Invention

The invention relates to an image processing method for noise reduction in a sequence of noisy images representing a threadlike structure on a background.

The invention particularly relates to a noise reduction method applied to a sequence of medical X-ray fluoroscopy images representing a catheter guide-wire. The invention also relates to a system for carrying out this method and to an examination apparatus having means for image processing.

The invention is applied to the medical examination apparatus industry.

An image processing system for filtering X-ray fluoroscopic image sequences is already known from U.S. Pat. No. 5,809,105. This document discloses means for acquiring an image by passing X-rays through a subject, said image comprising an array of pixel values, means for receiving the image and producing a mask therefrom, which distinguishes the pixel values that correspond to structural features in the image, from the pixel values that correspond to background and means being responsive to the mask for selectively filtering the pixel values in the image that corresponds to background. So, the mask is used to select the background pixels for filtering the background noise while enabling the structural pixels to pass to the display unfiltered. The means for filtering the background pixel values include a Poisson filter which is a spatial filter.

This known method does not provide enhancing means of the structure of interest which is always difficult to see in a fluoroscopic image when said structure is a threadlike structure such as a guide-wire. Besides, this known method does not take into account that structure may move very swiftly on the background and that the background may be difficult to filter without degradation of the structure for that reason.

SUMMARY OF THE INVENTION

It is an object of the invention to provide a method of enhancing the thread-like structure pixel values, to improve the background noise reduction without degradation of said thread-like structure.

This aim is attained by a method for noise reduction in a sequence of noisy original images representing a thread-like structure moving on a background. The method includes an acquisition of a pixel value at a current pixel location in a first and a second successive original image of the sequence, and comprising processing steps for producing a filtered pixel value at said current pixel location for reconstructing a filtered second image. The processing steps include a step of extraction of the threadlike structure for producing first and second binary mask image pixel values at said location from the first and second original image pixel values, steps of producing spatially and temporally filtered pixel values of the second original image, and a step of pixel value selection based on the binary mask image pixel values for producing respectively, as a finally filtered pixel value, either the temporally filtered pixel value as a background filtered pixel value, or the spatially filtered pixel value as a threadlike-structure filtered pixel value.

This aim is attained by a method for noise reduction in a sequence of noisy original images representing a thread-like structure moving on a background. The method includes an acquisition of a pixel value at a current pixel location in a first and a second successive original image of the sequence, and comprising processing steps for producing a filtered pixel value at said current pixel location for reconstructing a filtered second image. The processing steps include a step of extraction of the threadlike structure for producing first and second binary mask image pixel values at said location from the first and second original image pixel values, steps of producing spatially and temporally filtered pixel values of the second original image, and a step of pixel value selection based on the binary mask image pixel values for producing respectively, as a finally filtered pixel value, either the temporally filtered pixel value as a background filtered pixel value, or the spatially filtered pixel value as a threadlike-structure filtered pixel value [as claimed in claim 1].

A system for carrying out the above-described method is also included, as well as an examination apparatus with a system and means for carrying out the processing method described.

BRIEF DESCRIPTION OF THE DRAWINGS

The invention will be described in detail hereafter with reference to diagrammatic figures, wherein.

DESCRIPTION OF THE PREFERRED EMBODIMENTS

The invention relates to an image processing method for noise reduction in a sequence of noisy images representing a thread-like structure moving on a background. The invention particularly relates to a noise reduction method applied to a sequence of medical X-ray fluoroscopic images representing a catheter guide-wire. The invention also relates to a computing system and an examination apparatus, for example an X-ray apparatus, having such a computing system, and means for carrying out the processing method.

The sequence of images may be formed by f images representing blood vessels called arteriogram images. In cardiology, sequences of X-ray arteriogram images are used to visualize in real time medical procedures of introducing a catheter in a vessel. Such medical procedures using catheters deeply rely on the correct visibility of the guide-wire which is a metallic wire introduced in the vessel for guiding the catheter.

These fluoroscopic digital images are noisy because they are formed with a low level of X-rays. In this example, the method aims at extracting the guide-wire, at filtering the background and at reconstructing an improved sequence of images where the pixel values of the guide-wire are enhanced with respect to the filtered background.

According to the invention, an on-line image processing operation of extraction of this guide-wire in a sequence of arteriogram images, that is the detection and location of the points belonging to said guide-wire, is performed in order to serve the highly interesting purpose of constructing a binary extraction mask from the extraction operation. The extraction mask is further used in combination with a temporal recursive noise filter solely applied to the background pixels to reduce the quantum noise of the background in the sequence images and with a spatial filter solely applied to the guide-wire points to maintain the original guide-wire contrast. Also according to the invention, the contrast of the guide-wire structure is still enhanced with respect to the filtered background, thus increasing visibility in order to improve the practitioner's ability to perform a surgical operation. One of the problems which is solved by very accurate means according to the invention is the selection of the pixel values which must be either enhanced as guide-wire pixels, or be filtered as background pixels, in order to provide much improved images for the sequence, especially with the elimination of the phantom effect due to the motion of the thread-like structure.

The following method is carried out using two successive images of the sequence, including a first image referred to as causal image acquired at a first instant t−1, and a second image referred to as present image acquired at a second instant t. This method performs the processing of the image pixels according to a standard scanning of the images so as to filter each current pixel one after the other. The co-ordinates of the current pixel in the images is denoted i, j and the pixel values, referred to as samples, at this location i, j in the causal and present images, are denoted Xt−1, Xt respectively. This method is performed in real time, that is to say, at a rate of about 25 images per second.

According to the invention, the filtering of the background is preferably carried out using a temporal recursive adaptive filter. Temporal filters are generally known as giving the best filtering results in image sequences representing objects without motion. However, when using a temporal recursive filter in an image sequence representing a fine moving object such as the guide-wire, said guide-wire may be exposed to a possible small amount of degradation. Even when the temporal recursive filter involved is made adaptive to motion, complete moving-detail preservation is virtually impossible. In fact, the temporal recursive filter relies on pixel-wise fuzzy decisions regarding the occurrence of motion between consecutive images. Since these decisions are fuzzy and since X-ray fluoroscopy images are usually very noisy, the temporal filter fails to completely preserve weakly contrasted moving objects, because it fails to reach certainty about the occurrence of motion. This is the reason why the guide-wire pixels are extracted for providing the mask image that determines the extracted guide-wire pixel locations. The guide-wire is extracted in one image at a time, on a purely spatial basis, that is, regardless of its motion content. The corresponding mask image is also used to enhance the guide-wire points in the filtering process.

Figure 1:
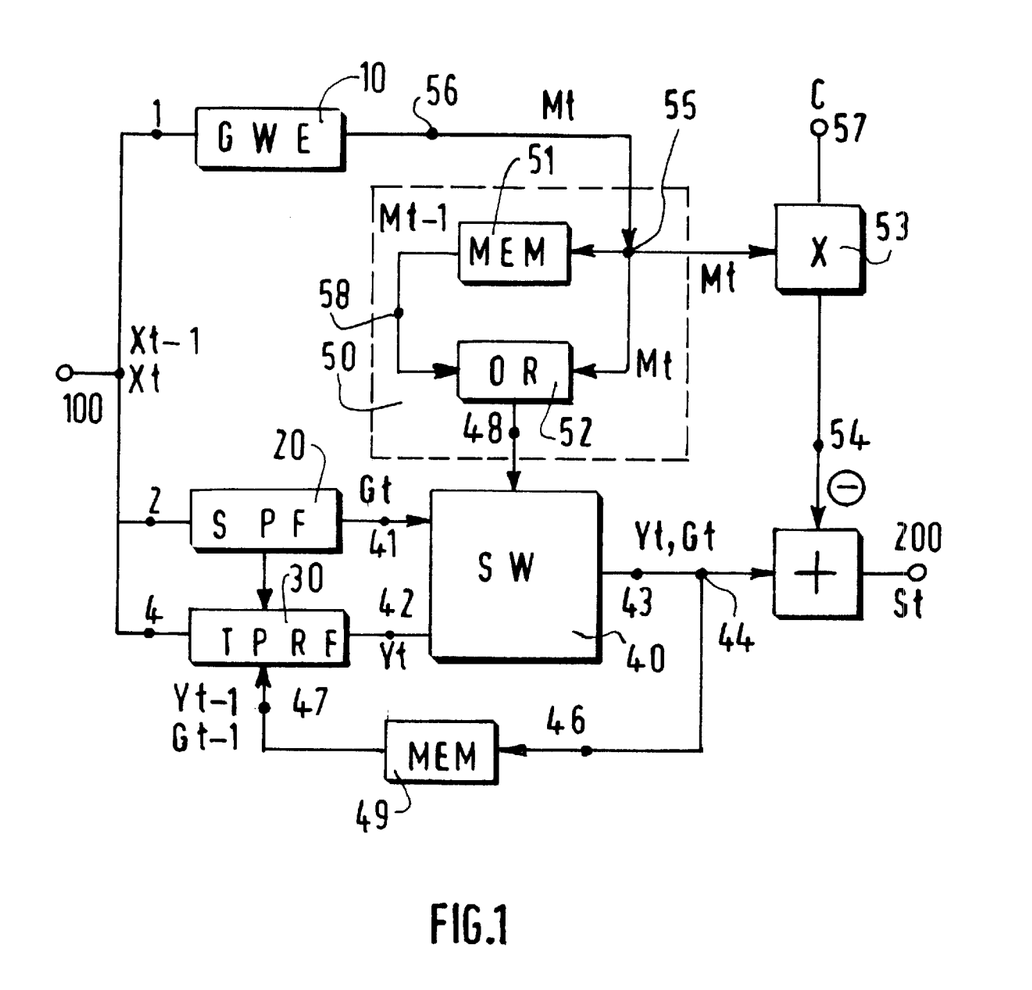
FIG. 1 is a functional block diagram illustrating the main steps of the method.

FIG. 1 diagrammatically shows the steps of the processing method of the invention for noise reduction in the images of a sequence representing a moving guide-wire as described above. The method processing steps produce a final filtered sample denoted St relative to each current pixel at a location i, j for reconstructing a filtered image at time t from the samples Xt−1, Xt of the causal and present images. This method comprises:

a step of acquisition 100 of the samples Xt−1, Xt of the current pixel located at the co-ordinates i, j respectively in the causal and present images of the sequence;

a step of guide-wire extraction 10 performed by an extraction module referred to as GWE, which receives at its input 1 said samples Xt−1, Xt, and produces at its output 56 respective binary mask samples Mt−1, Mt relative to said-current pixel; it is to be noted that the module GWE outputs a 1 data when the current pixel is a guide-wire pixel or outputs a 0 data when the current pixel is not a guide-wire pixel, thus is a background pixel;

a step of spatial filtering 20 performed by a purely spatial filter referred to as SPF, which receives at its input 2 the sample Xt of the present image, and produces at its output 41 a spatially filtered sample referred to as gate sample denoted Gt, a step of temporal filtering 30 performed by a temporal recursive filter referred to as TPRF, which receives at its input 4 said samples Xt−1, Xt of the causal and present images, and produces at its output 42 a temporally filtered sample denoted Yt. This temporal filter has a loop for receiving a filtered causal sample at the loop input 47, as described hereafter.

Now, the processing steps further comprise a sub-step 40 for:

either issuing the gate sample Gt in the case when the current pixel is selected as a guide-wire point at said location i, j at the present time t, or issuing the temporally filtered sample Yt when the current pixel is selected as a background pixel at said location i, j at said present time t for image reconstruction.

Said sub-step 40 is performed by a switch module denoted SW, which receives at the node 41 the gate sample Gt supplied by the spatial filter module SPF, and also receives at node 42 the time filtered sample Yt supplied by the temporal filter TPRF, further receives a binary 1 or 0 control signal at the node 48, and provides, at its output node 43, the gate sample Gt when the binary control signal is 1 corresponding to the selected presence of a guide-wire point at the location i, j, or produces, at said output node 43, the temporally filtered sample Yt when the binary control signal is 0 corresponding to the selected presence of a background point at said location i, j of the current pixel, at time t, for reconstruction of the present image.

The binary control signal at node 48 is provided by the binary output data of the GWE module 10 modified by a sub-step 50 for eliminating the phantom artifacts. The sub-step 50 is performed by a module referred to as PHE, which receives the binary mask samples Mt−1, Mt at the node 56. The causal mask sample Mt−1, which is received first, is stored in a memory or a delay 51 of the PHE module, so that said causal sample Mt−1 may be available at node 58 at the present instant t at the same time as the present mask sample Mt is available at node 55. Then nodes 55 and 58 constitute the inputs of a logic OR 52, which delivers a binary output equal to 1 each time at least one of its inputs is equal to 1, and which delivers a binary output equal to 0 only when both its inputs are equal to 0. This means that the output 48 of the PHE module delivers a signal 0 corresponding to the presence of background for image reconstruction only when both causal and present binary mask samples Mt−1, Mt are themselves equal to 0 corresponding to the actual presence of background in both causal and present images, and that the PHE module delivers a signal 1 corresponding to the presence of a guide-wire point at the location i, j for image reconstruction in all other cases, that is:

when both mask samples Mt−1 and Mt are equal to 1 corresponding to the actual presence of guide-wire at the location i, j both in the causal and present images, when only one of the two mask samples is equal to 1 corresponding to the actual presence of guide-wire in only one of the two images, the other image actually showing a background point at the location i, j of the current pixel.

The output 48 of the PHE module constitutes the binary control signal of the switch module SW 40. According to what is explained above, the SW module selects the gate sample Gt for further image reconstruction when the PHE module outputs 1, corresponding to the actual presence of a guide-wire point, either in both the causal and present images or in only one of said images, and selects the temporally filtered sample Yt for further image reconstruction solely when the PHE module issues a 0 signal corresponding to the actual presence of background in both said images. Thus, the temporal filter is not allowed to provide a filtered sample Yt, which is a smoothed combination of intensities at location i, j of samples at instants t−1 and t corresponding respectively to a background sample and a guide-wire sample. The result is that a guide-wire point that is present in i, j at the causal instant t−1 and is no longer present at the instant t, may not show through the image reconstructed at the instant t, since the temporal filter is only allowed to provide filtered samples corresponding to background.

Depending on the selection of the switch SW, the appropriate filtered sample Gt or Yt is supplied at the output 43 of said switch SW. Said filtered sample, either Gt or Yt, is stored in a second memory or a delay 49 and re-introduced at the loop input 47 in the temporal recursive filter TPRF for further processing the successive images of the image sequence.

The processing steps still comprise means for enhancing the guide-wire pixel values. As only the filtered samples Gt corresponding to the guide-wire exclusive of the filtered samples Yt corresponding to the background are desired to be enhanced, the enhancement means must be disposed astutely. To this end, the output 56 of the GWE module which provides the binary present mask sample Mt is entered in a multiplier 53 which also receives a constant value C to be multiplied by said binary present mask sample Mt. The output 54 of the multiplier 53 is either C or 0 according to the respective 1 or 0 value of the binary mask sample Mt. As the guide-wire samples are generally darker than the background, due to the X-ray absorption in the metal the guide-wire is made of, the enhancement of the guide-wire samples consists of minimizing the intensity level Gt, which is obtained at node 43, by applying the output signal C or 0 of the multiplier 53 negatively to this output signal of the switch SW. So, when the control signal of the switch is 1, the gate signal Gt is issued and is added in the adder 45 to a signal—C provided by the multiplier 53, since Mt=1. When the control signal of the switch is 0, the temporally filtered signal Yt is issued and is added in the adder 45 to a 0 signal supplied by said multiplier 53, since Mt=0.

In general, as Xt is the pixel value of a pixel at a location i, j in the present image at time t, and Yt is the corresponding pixel value filtered by an adaptive temporal recursive filter, said corresponding pixel value Yt may be defined by the following relation:

$$Yt = H[Xt, Yt-1] \quad (1)$$

at the location of pixel i, j, where H is a function. Now, as Gt is the spatially filtered pixel value of Xt, at the location i, j, for instance provided by the purely spatial filter SPF applied to Xt; as Mt is the binary extraction mask corresponding to the output 41 of GWE applied to Xt; and as St is the pixel value in the final filtered image at the same location i, j, the GWE 5 module advantageously intervenes in the filtering process as follows:

$$Yt = \{H[Xt, Yt-1] \& \sim [Mt-1 | Mt)]\} | \{Gt \& [Mt-1 | Mt]\} \quad (2a)$$

$$St = [Yt - C\, Mt] \quad (2b)$$

In the above equations (2a),(2b), the signs &, |, and ~ refer respectively to the logical operators AND, OR, and NOT, and C is an A PRIORI parameter defining a darkening level. The rationale behind such a combination stems from the following remarks:

In the temporal recursive process, the parts belonging to the moving guide-wire at time t might be partly impaired. So, the corresponding pixels are fruitfully replaced by their spatially filtered counterparts. Also in the temporal recursive process, the pixels corresponding to the locations that the moving guide-wire occupied in the previous image, at time t−1, might be corrupted by said effect known to those skilled in the art as "phantom effect" consisting in that the guide-wire pixels at time t−1 "show through the image" at time t. This well-known artifact is a pure product of recursivity and imperfect motion detection. Again, the corresponding pixels are fruitfully replaced by their spatially filtered counterparts.

The above two remarks explain the equation (2a) which corresponds to the inlaying of the spatially filtered value Gt at those locations that correspond to the guide-wire at time t−1 and/or at time t, i.e. where Mt−1 "OR" Mt equal 1 from the mask binary values.

In a preferred embodiment, the pixels belonging to a moving guide-wire are displayed with an artificial enhancement, that is a darkening in the case of an image containing a guide-wire obtained by an X-ray process. This action is controlled by the parameter C, which enhances the guide-wire visibility. However, this artificial darkening does not enter the recursive process and thus does not enhance phantom effects because, according to the invention, the parameter C is only applied to the displayed image values St when this value St is provided by the equation (2a). This proposed process to enhance the guide-wire visibility is given as an example and is no limitation.

Figure 2A:
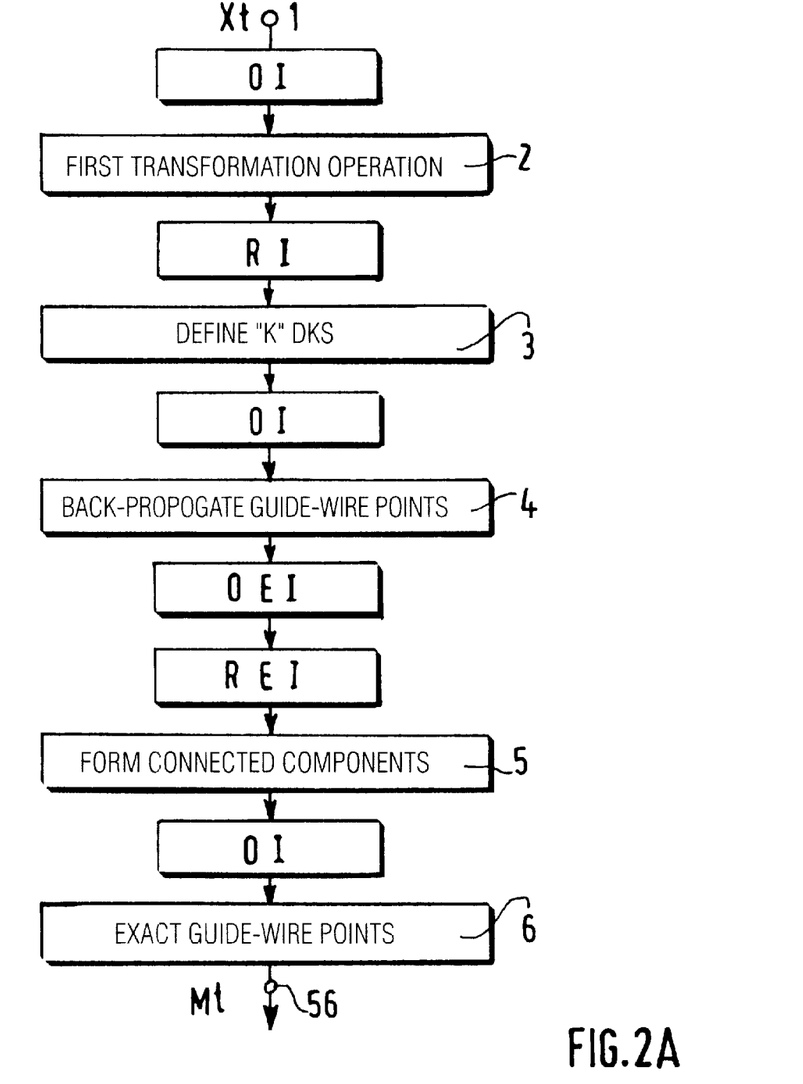
FIG. 2A is a functional block diagram illustrating the step of extraction of a thread-like object represented in an image.

Referring to FIG. 2, in an example of embodiment, the extracting module 10 referred to as GWE, which is provided to extract threadlike structures such as a guide-wire, comprises means or steps represented by functional boxes. Said GWE module first comprises means of acquiring, at its input 1, a current pixel value Xt at a location i,j in an image, referred to as original image OI of the sequence of images. This module GWE processes one original image at a time, in real time, to produce at its output 56 a resulting image of binary values Mt referred to as mask image pixel values, whose binary 1 values determine the location of the guide-wire in the corresponding original image at an instant t, while the binary 0 values correspond to the pixels other than guide-wire pixels i.e. background pixels.

This processing step module GWE preferably includes a first transformation operation 2 to provide a reduced image RI from the original image OI. Said transformation operation 2 may comprise a morphological erosion with a flat kernel of a size n×n followed by a corresponding sub-sampling operation of one point every n points of the original image OI along the axes of the flat kernel.

Figure 2B:
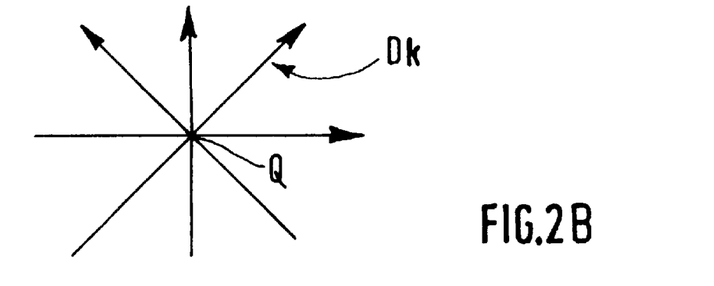
FIG. 2B illustrates oriented directions Dk.

The processing steps further comprise, performed in said reduced image RI, a step 3 of selecting of the most probable locations of the guide-wire points. This step 3 includes, at each current point denoted Q of said reduced image RI, the selection of the direction of the guide-wire as the best match with one of several predetermined regularly oriented directions denoted Dk, followed by a probing operation of the contrast around and in said selected directions. To this end, this step 3 comprises an operation of defining a predetermined number k of regularly oriented directions Dk, and an operation of selecting tangential direction according to a criterion that selects a point as a possible guide-wire point whenever the average gray level value on an oriented kernel in one of the directions Dk crossing said point is minimum with respect to the other directions. Said step 3 further includes an operation of contrast measurement, performed at each point selected as possible point of the reduced image RI, by evaluating a difference between a local intensity average in the tangential direction Dk which has been selected at said point, and local averages in the orthogonal direction with respect to the selected direction Dk. Said step 3 further includes an operation of threshold of the contrast measurement for selecting the candidate guide-wire points in the reduced image RI.

Then, the processing steps comprise a step 4 performed in the corresponding original image OI. In step 4, the selected candidate guide-wire points of the reduced image RI are back-propagated into the original image OI together with their selected orientations. Said step 4 further comprises an operation of probing the contrast around the candidates. To this end, contrast measurements are performed in said original image OI by evaluating a difference between a local average in the selected tangential direction Dk and local averages in the orthogonal directions with respect to the selected direction Dk. In said original image OI, the processing step 4 further includes an operation of extracting the points which answer a criterion of maximum contrast measurement thus providing an original extraction image denoted OEI.

The points selected at step 4 in the original image OI are back-propagated into the reduced image RI in a further processing step 5, thus creating a reduced extraction image. denoted REI. The processing step 5 now comprises an operation of connecting said points together according to connectivity criterions for forming connected components. Then said components receive a label and may be subjected to selectivity criterions.

The processing steps further comprise a step 6 wherein the selected labeled components of the reduced extraction image REI are back-propagated into the original image OI and are finally extracted as guide-wire points of the original image OI.

The purely spatial filter 20 referred to as SPF, which produces the signal Gt at its output 41 from the original signal Xt applied to its input 2, may be a spatial FMH (FIR-Median-Hybrid) filter, well known to those skilled in the art.

Figure 3A:
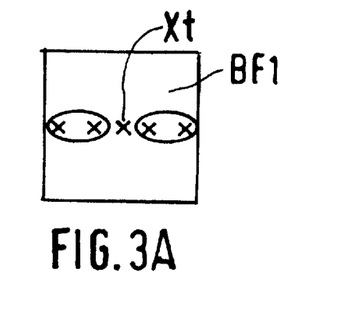
FIGS. 3A to 3G illustrate the step of spatial filtering.
Figure 3B:
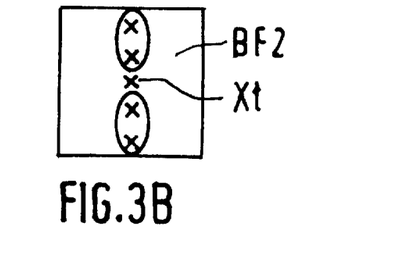
Figure 3C:
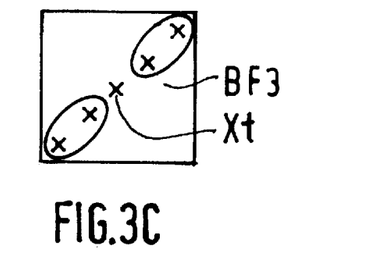
Figure 3D:
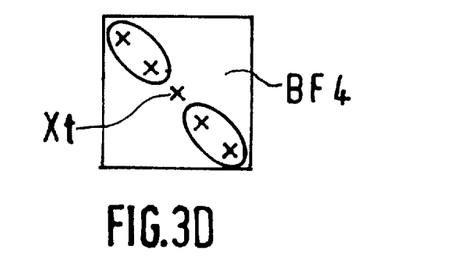
Figure 3E:
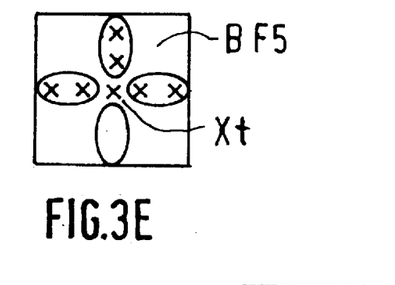
Figure 3F:
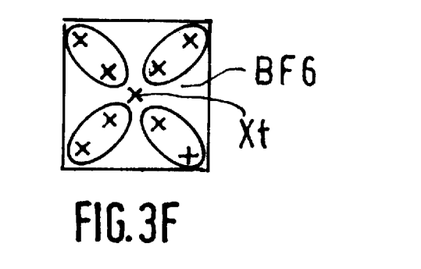
Figure 3G:
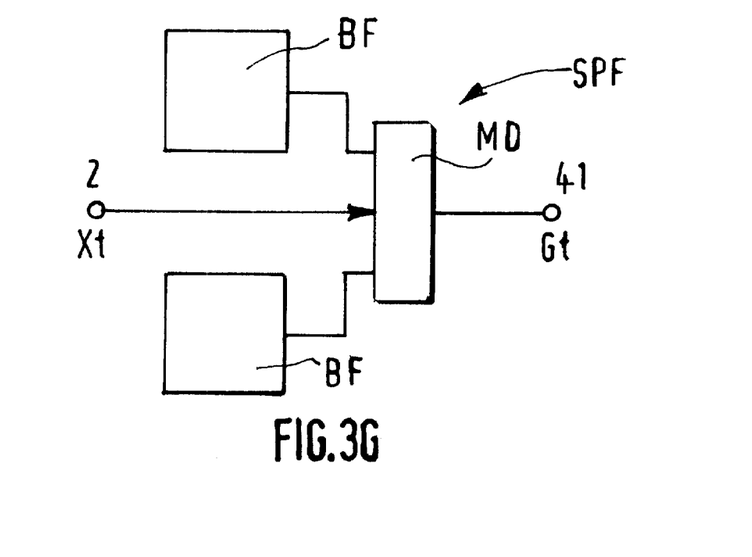

Referring to FIG. 3G, in such a FMH filter, the final output Gt is the median value calculated of the outputs of FIR (Finite Impulsion Response) basic filters denoted BF and the input sample Xt. Several types of basic FMH filters can be formed. As shown in FIG. 3A to 3D, the FMH basic filters denoted BF1 to BF4 may be unidirectional in the case where they include two FIR sub-filters. As shown in FIG. 3E and 3F, the FMH basic filters may be bidirectional in the case where they include four FIR sub-filters. The FIR sub-filters are symmetrically located with respect to the input sample Xt which is thus centrally located. In the unidirectional FMH basic filters, the FIR sub-filters and the central input sample Xt are located on a same line. In the bi-directional FMH basic filters, the FIR sub-filters form a cross. The FIR sub-filters may be advantageously average sub-filters. Preferably basic FMH filters as shown in FIG. 3A to 3F are combined for forming a Median filter denoted MD as shown in FIG. 3G, where the basic filters BF are symmetrically located with respect to the input central sample Xt. Such FMH filters as shown in FIG. 3G including Median of basic filters show a good line preserving ability.

Figure 4A:
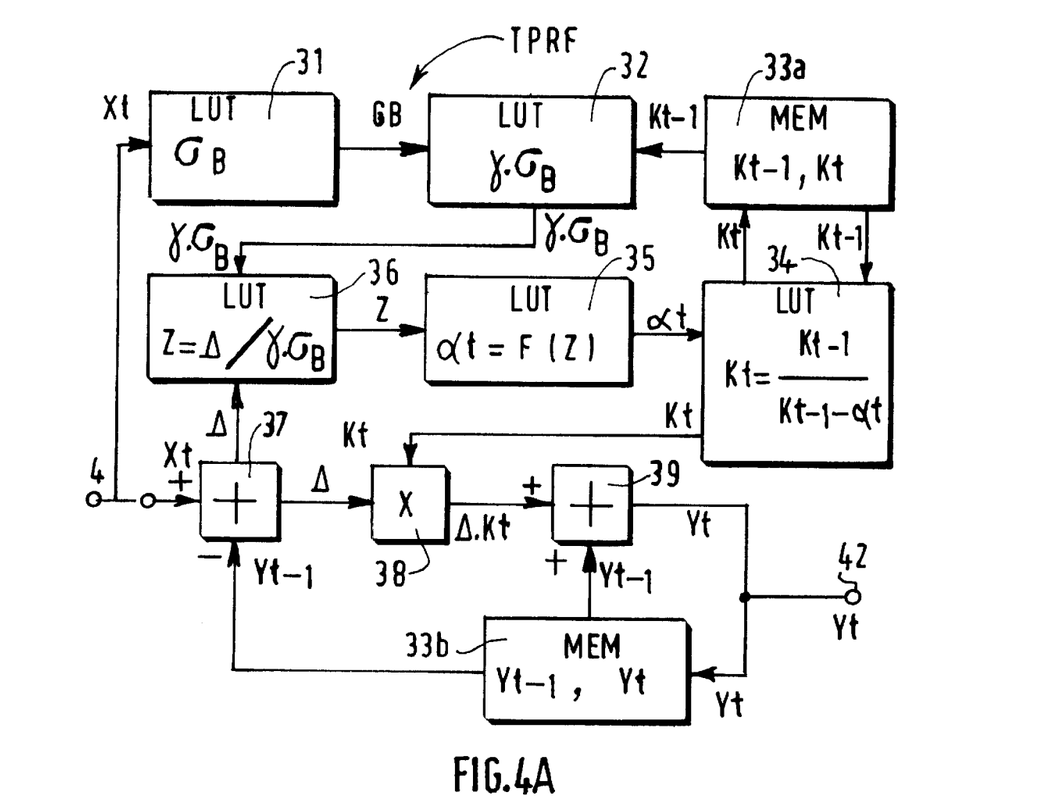
FIG. 4A is a functional block diagram illustrating the step of temporal filtering and FIG. 4B represents a filtering coefficient for the temporal filtering.

FIG. 4A represents diagrammatically a temporal recursive filter which can adapt itself to intensity discontinuities due to motion or noise peaks. This temporal filter performs calculations according to the recursive equation:

$$Yt = Yt-1 + Kt(Xt - Yt-1) \tag{3a}$$

This equation is referred to as integration equation and takes into account the filtered causal sample Yt−1 at the instant t-i, modified by what is called hereafter a causal innovation term, which is formed by the difference between the filtered sample Yt−1 at the instant t−1 and the noisy sample Xt observed at the present instant t. This innovation term is multiplied by a term called causal gain factor Kt which varies between 0 and 1. This equation (3a) produces the filtered value Yt which is the desired temporally filtered sample.

The gain factor Kt is calculated according to the following recursive equation:

$$Kt = Kt-1/(Kt-1 + \alpha t) \tag{3b}$$

Where α t is a causal continuity coefficient given by the following equation:

$$\alpha t = F(\Delta/\gamma \cdot \sigma_B) \tag{3c}$$

and where said causal continuity coefficient α t is defined as a function F of a difference Δ given by the following relation:

$$\Delta = |Xt - Yt-1| \tag{4}$$

Where Xt is the sample of the present instant t to be filtered and Yt−1 is the sample already filtered at the causal instant t−1. The factor $\sigma_B$ is the standard noise deviation with respect to he intensity mean value, whose determination is well known to those skilled in the art. The factor γ is used to approximate the standard noise deviation factor $\sigma_B$ according to the following relation:

$$\gamma = [2/(2 - Kt-1)]^{1/2} \tag{5}$$

where the γ factor depends on the gain factor Kt−1 of the causal instant t−1 and is referred to as causal gain factor.

Figure 4B:
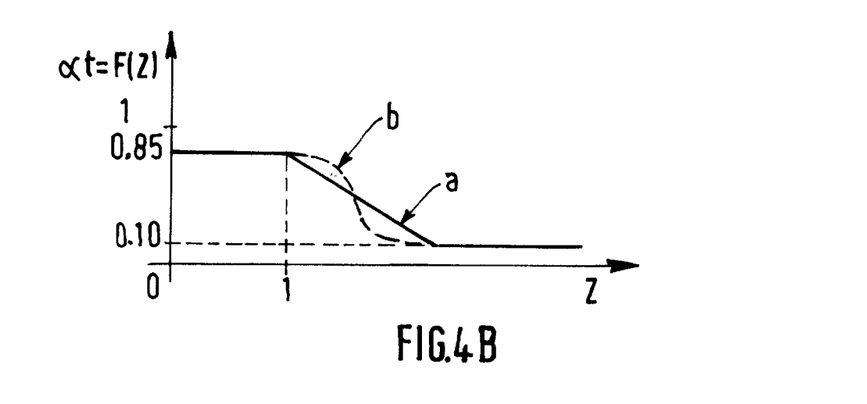

The function F may be of the form represented in FIG. 4B. The values:

$$Z = \Delta/\gamma \cdot \sigma_B \tag{6}$$

are represented along the abscissa axis and the values of F(Z) are represented along the ordinate axis. The function F(Z) may be constant and smaller than or equal to 1 as represented by a solid on FIG. 4B, for instance equal to 0.85, for $0 \leq Z \leq 1$. Then the function may linearly decrease to a value equal or superior to 0, for instance 0.10, as represented by the solid (a), or may decrease between the same values according to a shifted Gaussian curve (b) for $1 \leq Z$. When F remains between such values as 0.1 to 0.85, then the intensity discontinuities are better filtered and particularly smoothed.

So, referring to FIG.4A, the proposed temporal filter comprises:

An input 4 for the noisy original samples Xt−1, Xt, relates to a given location denoted i, j in the sequence of images. The noisy sample Xt of the present instant t is delivered to the input of a module LUT 31 which provides at its output the standard noise deviation $\sigma_B$ of said noisy signal Xt. The first memory MEM 33a supplies the causal gain factor Kt−1 of the preceding instant to the module LUT 32 which also receives the standard noise deviation $\sigma_B$ and provides the factor y given by equation (5) and hence the product $$\gamma \cdot \sigma_B \quad (7)$$

The temporal filter comprises a second memory MEM 33b for storing the filtered intensity Yt−1 of the preceding instant. Said intensity value Yt−1 is supplied to an adder 37 at the same time as the noisy intensity Xt of the present instant t to provide the difference Δ of relation (4). Said difference Δ is applied to a module LUT 36 which also receives the product $\gamma \cdot \sigma_B$ of relation (7) and produces the value Z as given by equation (6), which is further applied to the module LUT 35. Said module LUT 35 produces the causal continuity factor Δt according to equation (3c), which is then applied to the module LUT 34. Said module LUT 34 also receives the causal gain factor Kt−1 of the preceding instant supplied by the first memory MEM 33 and produces the gain factor Kt of the present instant.

A multiplier 38 receives the difference Δ from the adder 37 and the gain factor Kt of the present instant from the module LUT 34 and applies the product:

$$\Delta Kt \quad (8)$$

to a second adder 39. Said second adder also receives the filtered sample Yt−1 of the preceding instant provided by the second memory MEM 33b and produces the filtered sample Yt of the present instant, which is available at the output 42 and is also stored in said second memory MEM 33b for further processing.

So the computation of the filtered sample Yt of the present instant is achieved by the relation:

$$Yt=Yt-1+\Delta Kt \quad (3a')$$

which is another form of the equation (3a). recursive filter may be tables of values such as the LOOK-UP-TABLES known to those skilled in the art.

Figure 5A:
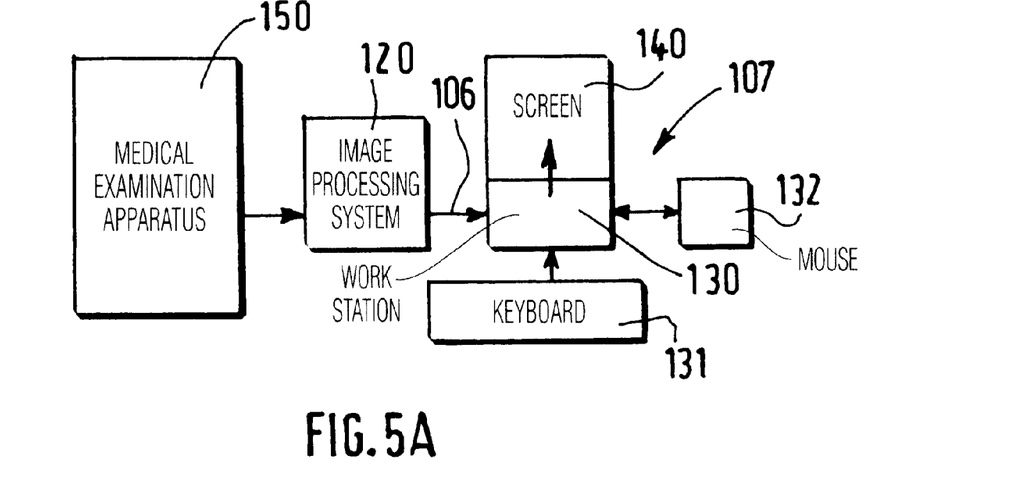
FIG. 5A is a functional block diagram illustrating an examination apparatus having a system and means for carrying out the method of FIG. 1

Referring to FIG. 5A, image data of a sequence of images, provided for instance by a medical examination apparatus 150, may further be applied to an image processing system 120 for processing the data according to the method of the invention. This image processing system 120 may be a suitably programmed computer of a workstation 130 having a screen 140, or a special purpose processor having circuit means such as LUTs, Memories, Filters, Logic Operators which are arranged to perform the functions of the method steps according to the invention. The workstation 130 may also comprise a keyboard 131 and a mouse 132. The processing system may be connected to storage means for storing the medical images.

Figure 5B:
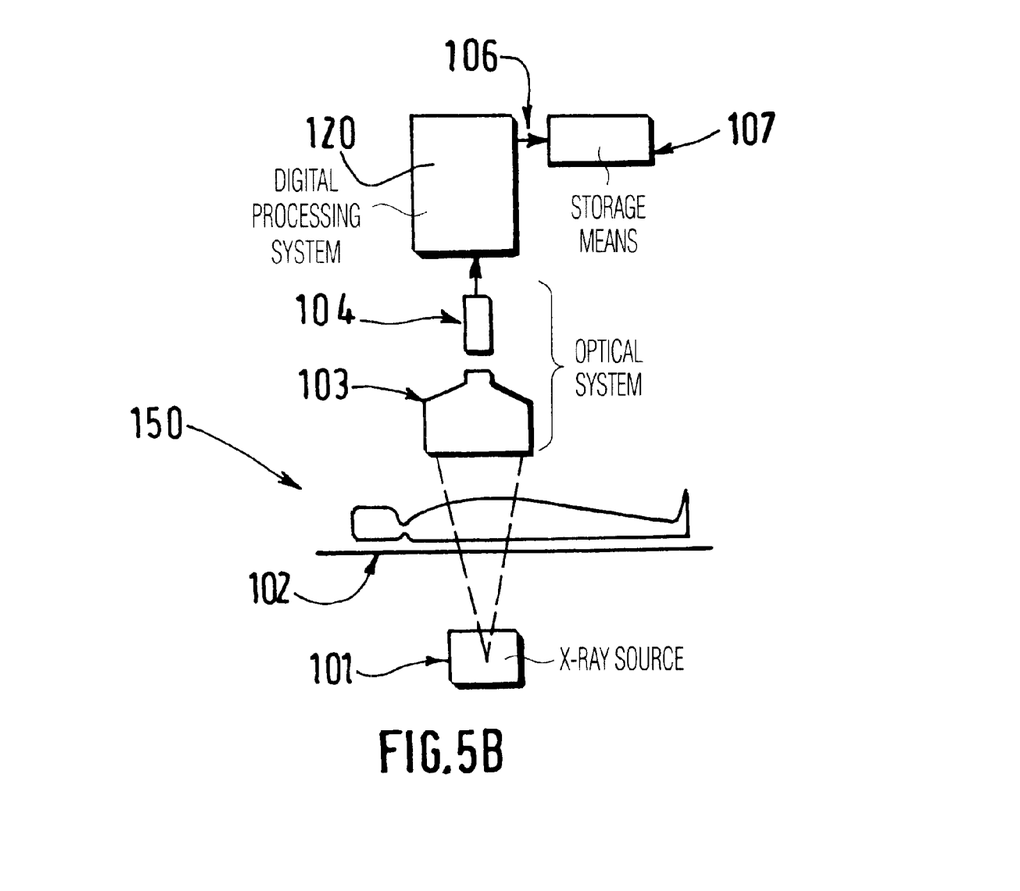
FIG. 5B illustrates an X-ray apparatus for supplying image data to a processing system.

Referring to FIG. 5B, an X-ray medical examination apparatus 150 comprises means for acquiring digital medical image data of a sequence of images at least comprising a causal and a present image, and a digital processing system 120 for processing these data according to the processing method described above. The X-ray apparatus comprises an X-ray source 101, a table 102 for receiving a patient to be examined, an optical system 103, 104 for applying image data to the processing system 120 which has at least one output 106 to apply image data to display and/or storage means 107. The display and storage means may respectively be the screen 140 and the memory of a workstation 130 as described in relation to FIG. 5A. Said storage means may alternately be external storage means.

What is claimed is:

1. An image processing method for noise reduction in a sequence of noisy original images representing a thread-like structure moving on a background, said method comprising an acquisition of a pixel value at a current pixel location in a first and a second successive original image of the sequence, and comprising processing steps for producing a filtered pixel value at said current pixel location for reconstructing a filtered second image, wherein are included:

a step of extraction of the threadlike structure for producing first and second binary mask image pixel values at said location from said first and second original image pixel values, steps of producing spatially and temporally filtered pixel values of the second original image, and a step of pixel value selection based on said binary mask image pixel values for producing respectively, as a finally filtered pixel value, either the temporally filtered pixel value as a background filtered pixel value, or the spatially filtered pixel value as a threadlike-structure filtered pixel value.

2. A method as claimed in claim 1, wherein:

the step of pixel value selection determines, from the first and second binary mask image pixel values, whether the current pixel has been a background pixel in the two successive binary mask images, or has been a thread-like structure pixel value in at least one of the two successive binary mask images, for providing respectively, as a finally filtered pixel value, either the temporally filtered pixel value as a background filtered pixel value, or the spatially filtered pixel value as a threadlike-structure filtered pixel value.

3. A method as claimed in claim 2, wherein:

as the mask images provide binary pixel values, the step of pixel value selection comprises a switch operation for issuing either the temporally or the spatially filtered pixel value according to a binary control signal value based on said binary pixel values at the current pixel location in two successive mask images.

4. A method as claimed in claim 3, wherein:

the binary control signal value is produced by a logic OR operation whose inputs are the two successive binary mask image pixel values at the current pixel location and whose output is either a first binary control signal value (0) to trigger the temporally filtered pixel value when the two successive binary mask image pixel values both correspond to background or a second binary control signal value (1) to trigger the spatially filtered pixel value when at least one of the two successive binary mask image pixel values corresponds to the threadlike structure.

5. A method as claimed in claim 4, wherein:

the spatially filtered pixel value produced by the switch operation is enhanced by an enhancing operation based on the pixel value selection operation.

6. A method as claimed in claim 5, wherein:

in the mask images, the pixel values are binary signals which are given the zero (0) value for ground pixels and the one (1) value for thread-like structure pixels, and the first binary control signal which triggers the time-filtered pixel values corresponding to background has the zero value, whereas the second binary control signal which triggers the spatially filtered pixel values corresponding to the threadlike structure has the one value.

7. A method as claimed in one of claim 5, wherein:

the operation to enhance the spatially filtered value comprises a multiplying operation by a constant value (C) applied to the second binary mask image pixel value so as to produce either a zero (0) signal value or said constant value (C) respectively, depending on whether said second mask pixel value is a ground pixel or a thread-like structure pixel, and comprises an adding operation applied to the filtered pixel value issued by the switch operation, which subtracts the zero value (0) when the switch operation triggers the time-filtered pixel value corresponding to background, and which subtracts the constant value (C) when the switch operation triggers the spatially filtered pixel value corresponding to the threadlike-structure.

8. A method as claimed in claim 1, wherein:

the temporal filter is a recursive adaptive temporal filter and the spatial filter includes median filtering.

9. A system comprising a suitably programmed computer of a workstation or a special-purpose processor having circuit means, which are arranged to process image data according to the method for noise reduction in a sequence of noisy original images representing a thread-like structure moving on a background, said method comprising an acquisition of a pixel value at a current pixel location in a first and a second successive original image of the sequence, and comprising processing steps for producing a filtered pixel value at said current pixel location for reconstructing a filtered second image, wherein are included:

a step of extraction of the threadlike structure for producing first and second binary mask image pixel values at said location from said first and second original image pixel values, steps of producing spatially and temporally filtered pixel values of the second original image, and a step of pixel value selection based on said binary mask image pixel values for producing respectively, as a finally filtered pixel value, either the temporally filtered pixel value as a background filtered pixel value, or the spatially filtered pixel value as a threadlike-structure filtered pixel value, and having means for displaying images processed according to said method, and occasionally means for storing the image data.

10. An X-ray apparatus having means for acquiring digital medical image data and having a system comprising a suitably programmed computer of a workstation or a special-purpose processor having circuit means, which are arranged to process image data according to the method for noise reduction in a sequence of noisy original images representing a thread-like structure moving on a background, said method comprising an acquisition of a pixel value at a current pixel location in a first and a second successive original image of the sequence, and comprising processing steps for producing a filtered pixel value at said current pixel location for reconstructing a filtered second image, wherein are included:

a step of extraction of the threadlike structure for producing first and second binary mask image pixel values at said location from said first and second original image pixel values, steps of producing spatially and temporally filtered pixel values of the second original image, and a step of pixel value selection based on said binary mask image pixel values for producing respectively, as a finally filtered pixel value, either the temporally filtered pixel value as a background filtered pixel value, or the spatially filtered pixel value as a threadlike-structure filtered pixel value, and having means for displaying images processed according to said method, and occasionally means for storing the image data that has access to said digital medical image data for processing said image data.

* * * * *